F. O. WOODLAND.
LABELING MACHINE.
APPLICATION FILED MAR. 10, 1904.
941,178.
Patented Nov. 23, 1909.
7 SHEETS—SHEET 5.
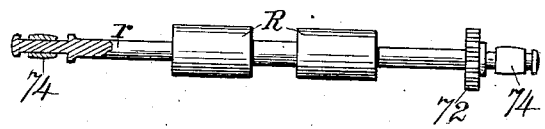
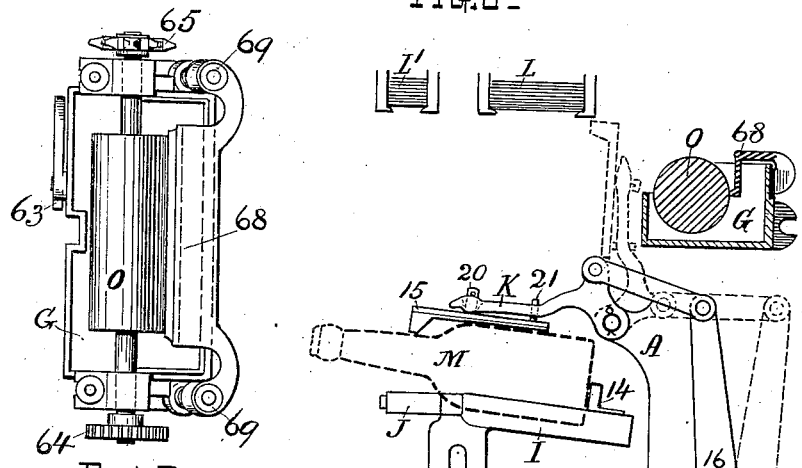
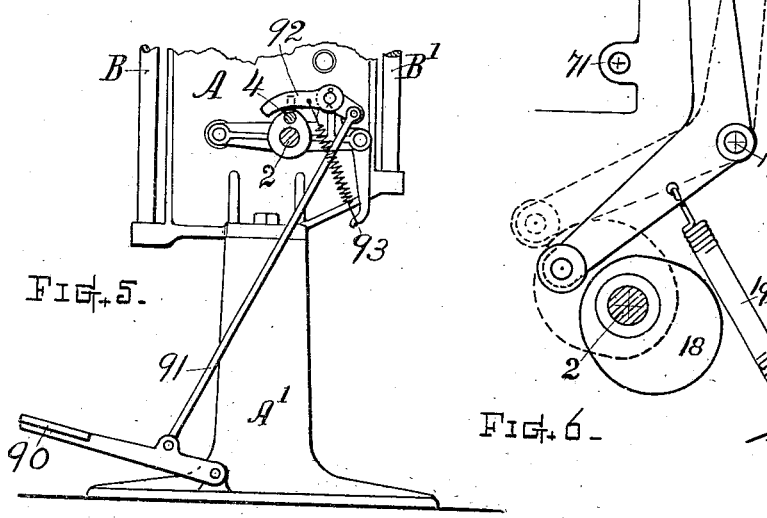
Witnesses
Charles L. Bacon
Fred H. Flinn
Inventor
Frank O. Woodland
By Chas. H. Burleigh
Attorney

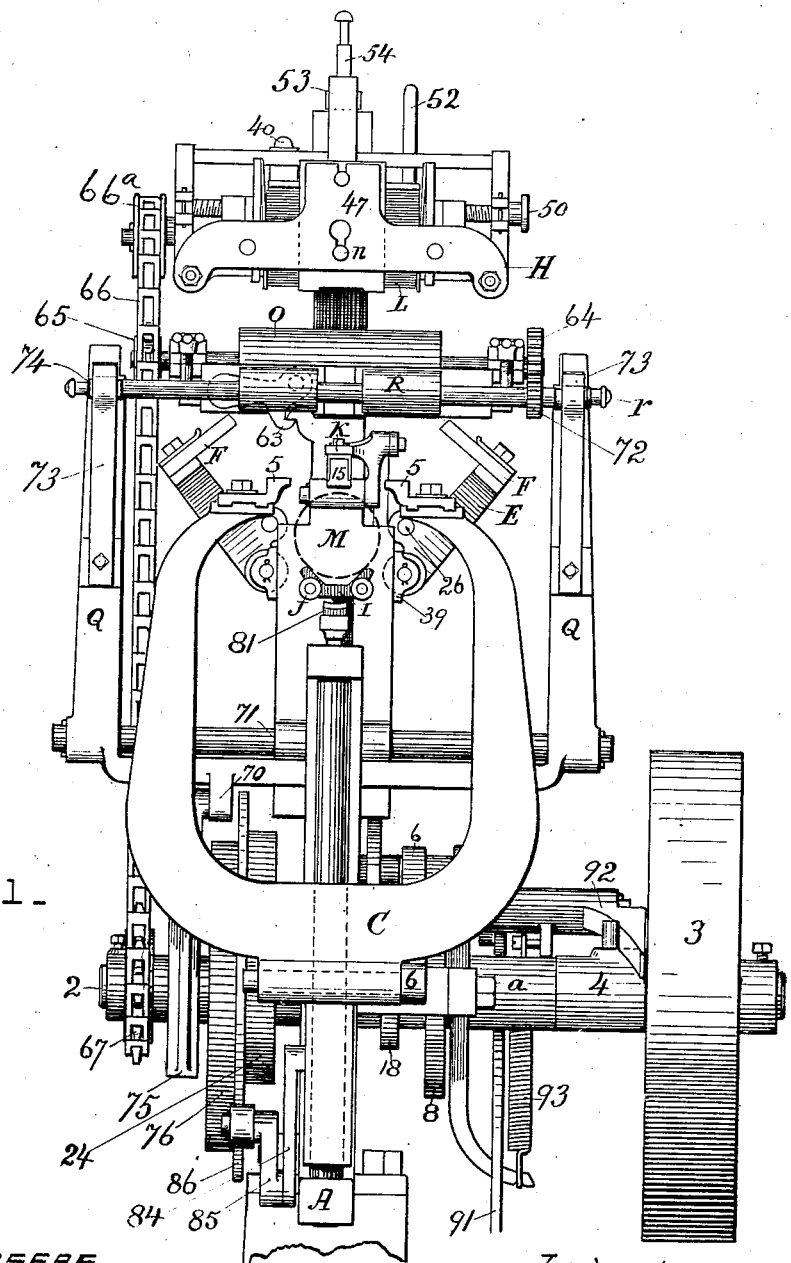

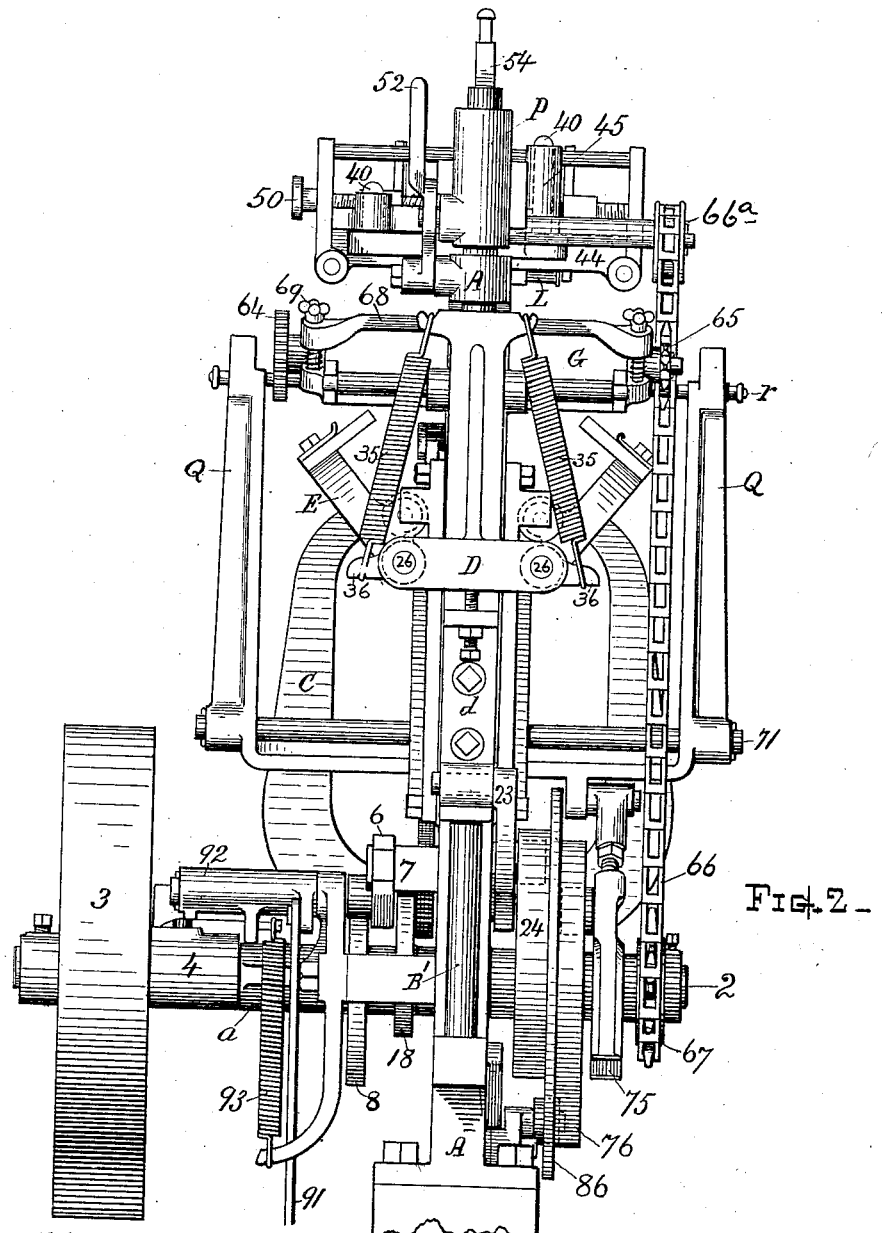

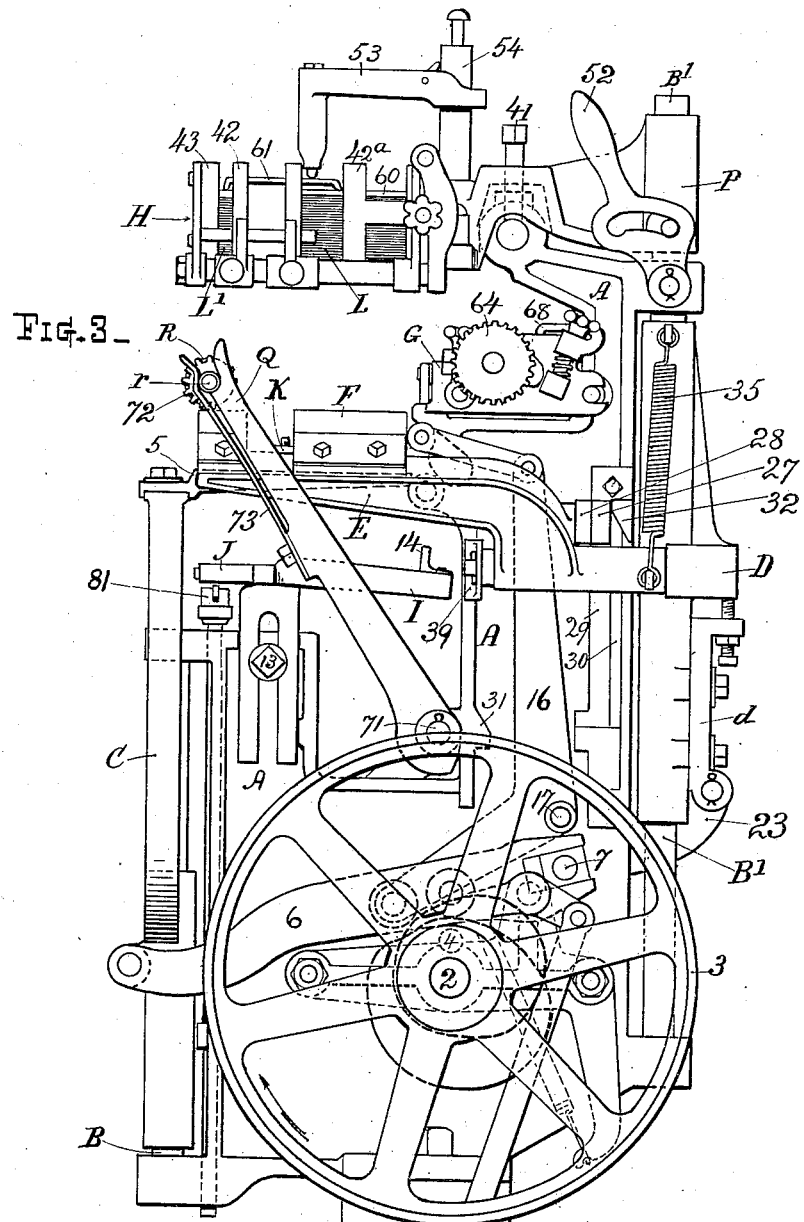

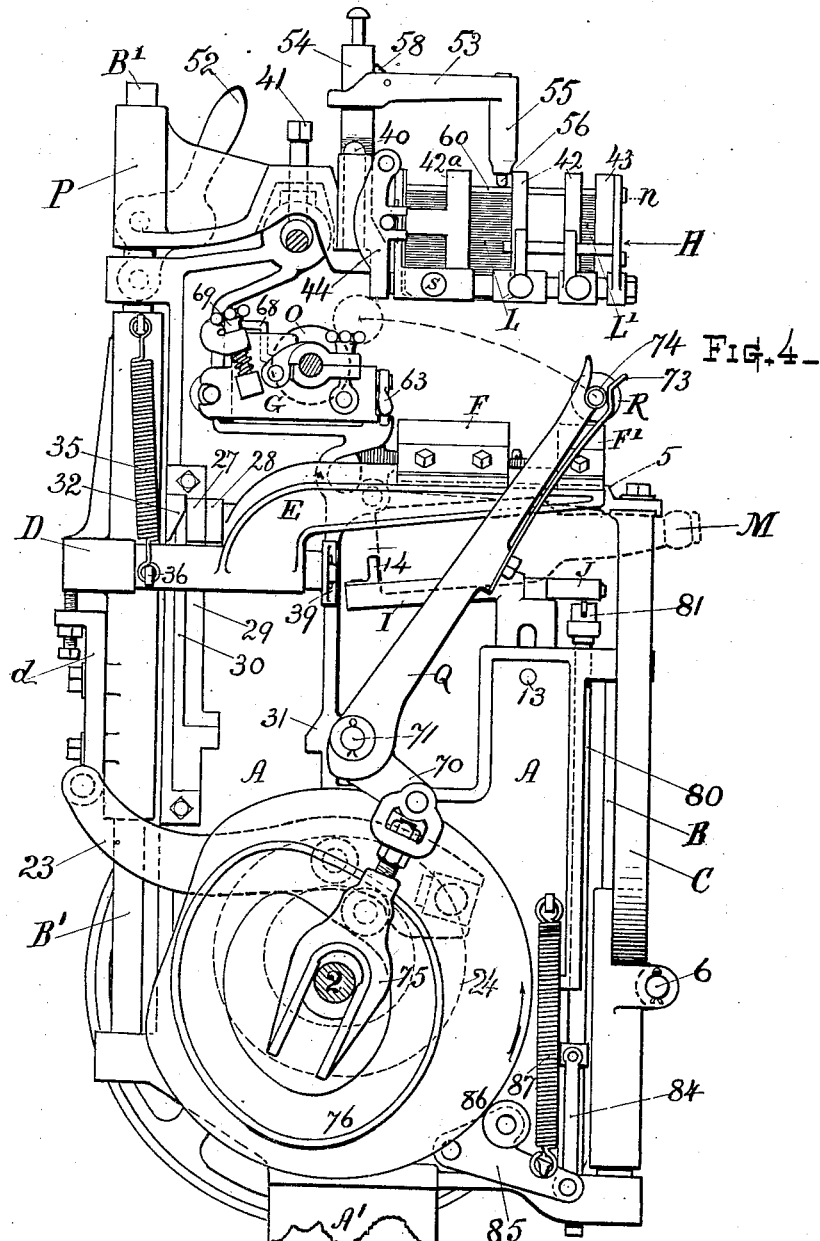

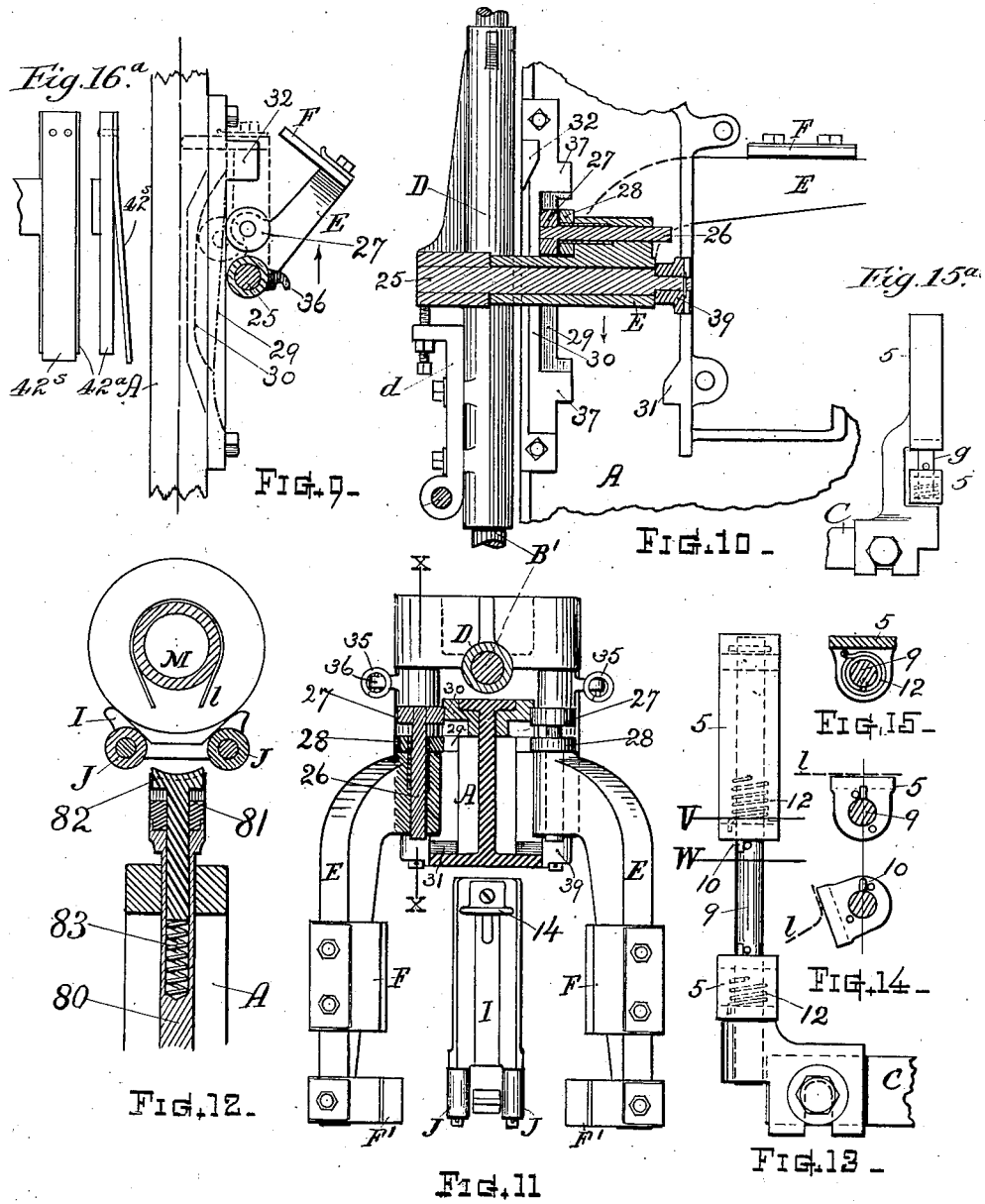

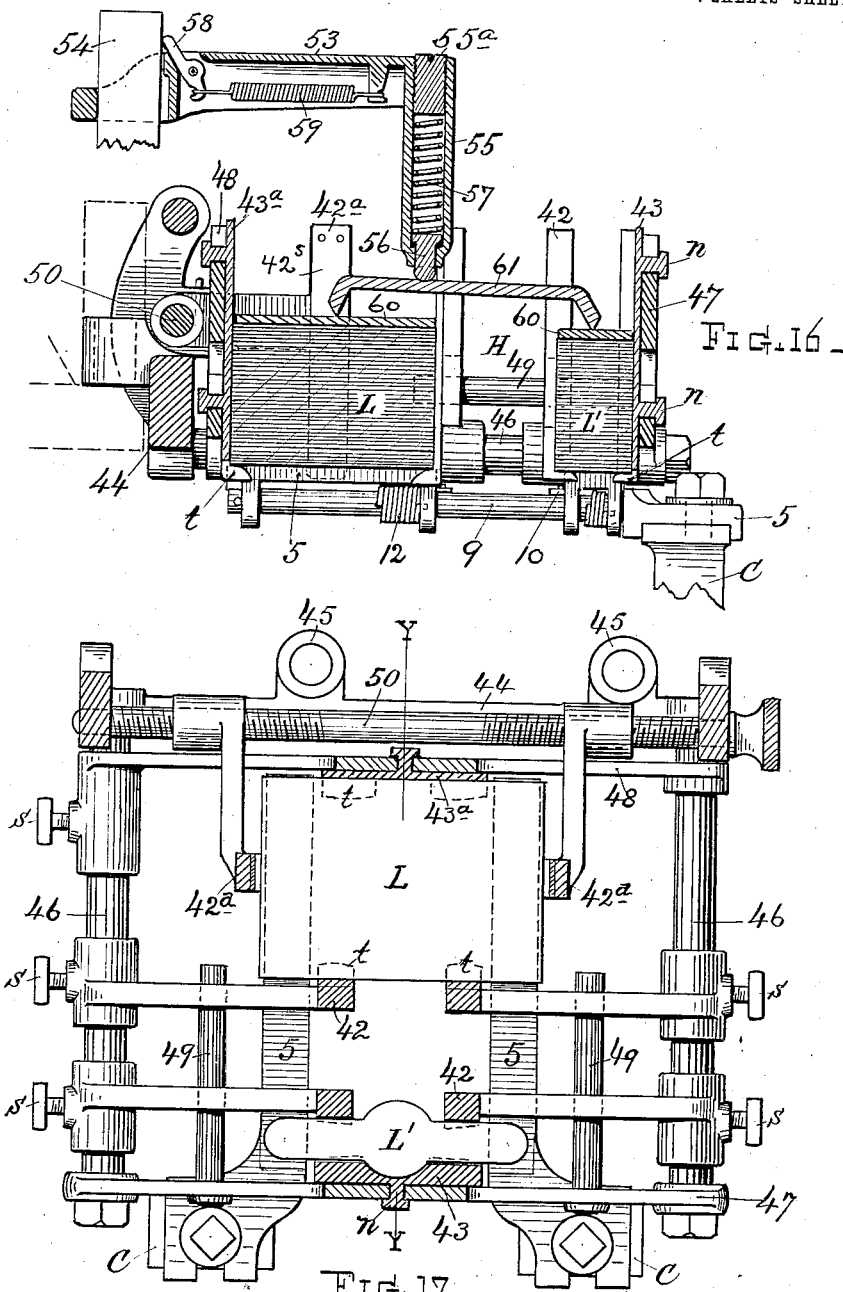

UNITED STATES PATENT OFFICE.

FRANK O. WOODLAND, OF WORCESTER, MASSACHUSETTS.

LABELING-MACHINE.

941,178.  Specification of Letters Patent.  Patented Nov. 23, 1909.

Application filed March 10, 1904. Serial No. 197,485.

*To all whom it may concern:*

Be it known that I, FRANK O. WOODLAND, a citizen of the United States, residing at Worcester, in the county of Worcester and State of Massachusetts, have invented a new and useful Labeling-Machine, of which the following, together with the accompanying drawings, is a specification sufficiently full, clear, and exact to enable persons skilled in the art to which this invention appertains to make and use the same.

The prime object of my present invention is to provide a more desirable, convenient and practically efficient mechanism for the purpose named, and to render the various parts and combinations peculiarly suited for performing their respective functions for the affixment of labels in a sure, expeditious and satisfactory manner.
Another object is to provide a machine of the character described, having facilities for the delivery and affixment of a plurality of separate labels simultaneously at one operation of the machine.
Minor objects and features of the invention are set forth and explained in the following detailed description.

My invention consists in mechanism organized for operation substantially as set forth, and in the parts and novel combinations of parts as explained and illustrated, the particular subject matter claimed being hereinafter definitely specified.

In the accompanying seven sheets of drawings, Figure 1 represents a front view of a labeling machine embodying my invention, the supporting base and standard being omitted. Fig. 2 is a rear view; Fig. 3 is a side view at the right hand side. Fig. 4 is a side view at the left hand side, the glue-roll drive-chain and sprockets being omitted for clearer illustration. Fig. 5 is a side view on a smaller scale of the lower part of the frame and base standard, showing the clutch-controlling devices and treadle. Fig. 6 represents a detail side view illustrating the action of the grip-finger and a section of the glue-box mechanism. Fig. 7 is a separate plan view of the glue-box mechanism. Fig. 8 is a view of the glue-carrying or transferring rolls and their axle separated from their support. Figs. 9 and 10 represent fragmentary views, partly in section at line X X on Fig. 11, illustrating the wiper-arm action. Fig. 11 is a plan view of the wiper mechanism and bottle rest. Fig. 12 is a separate detail view (on a somewhat larger scale) showing devices for pressing the ends of a label underneath the bottle. Fig. 13 is a plan view of a picker having rockable face members. Fig. 14 shows a section at line W of the rockable picker. (in two positions.) Fig. 15 shows a section of the same at line V. Fig. 15$^a$ represents a plan view of a picker having a portion of its face rockable and a portion non-rockable. Fig. 16 represents a vertical section of a duplex label-holder at line Y Y, Fig. 17. Fig. 16$^a$ represents a front and side view of one of the label-holder guide-stakes as made with a spring face and employed at the ends of the label pack where the glue-applying pickers contact therewith, and Fig. 17 is a horizontal section or plan view of the duplex label-holder.

This improved labeling machine is provided with a suitable frame, preferably made with a column or standard $A^1$ having a broad base at its foot, and at its top a centrally disposed body portion A with upright guides or rods B and $B^1$ fixed therein at its front and rear, and having a transverse hub and bearing $a$ in which the operating shaft is mounted. Said shaft is furnished with a loose driving pulley or wheel 2; an automatic-stop clutch 4 for operatively connecting and disconnecting the shaft and pulley; and with a series of cams for actuating various parts of the mechanism. The machine as herein illustrated and described is adapted for the simultaneous application, to a bottle or similar article, of a plurality of labels at one operation; or it may be used for applying but a single label at one operation.

The working parts comprise a picker-carrier C, mounted to slide vertically on the front guide B, and provided with two upwardly projecting arms having suitable seats on their upper end to which the glue-applying pickers 5 are secured; a wiper-slide D movable on the rear guide $B^1$ and carrying a pair of offset, rockable wiper-arms E having the wipers F mounted thereon; means for transferring glue or adhesive paste to the pickers; suitable connections for imparting motion to the various active parts; a label-holder mechanism H; a glue-box or reservoir G for containing the supply of glue, gum, paste or adhesive material, with a delivery-roll, or rolls, in said reservoir; and means for regulating the quantity of glue or adhesive material delivered thereby.

The nature, construction and mode of operation of these several mechanisms in their preferred form of embodiment will now be further explained.

The pickers 5 are detachably but firmly supported upon the bifurcated slide or carrier C that moves up and down the front guide-rod, said carrier being operated by a connection or lever 6 fulcrumed on the frame at 7 and actuated by a cam 8 mounted on the shaft 2. Said pickers have surfaces adapted for printing the glue or adhesive substances upon the under labels of the packs L L¹, when the picker mechanism is elevated into conjunction with the overhanging stationary label-holder, and for picking a label from the bottom of the packs and presenting said labels in position for affixment to the bottle when the pickers descend.

In Figs. 13, 14 and 15 there is shown, in detail, a picker as made with a rockable face. In this construction the picker has an axis or rod 9 projecting from its attaching head, and one or more face-pieces are mounted thereon by means of hinging lugs or ears, so as to have a partial rotative movement (see positions in Fig. 14). Means, such as stop-pins 10 on lugs, is provided for limiting the rocking movement, and a suitable spring 12, combined with the face-piece, serves for returning it to normal position with its face upward. This rocking picker effects the peeling of the label l therefrom by a rolling pull instead of a slide draft, and thus avoids liability of tearing the paper. When preferred the pickers can be made solid, or without rockable face portions; an example of solid pickers being shown in Figs. 1 and 17. When the machine is adapted for simultaneously affixing a plurality of labels the pickers are preferably constructed with a corresponding plurality of glue-applying face-sections and a recess between the respective sections. To suit various kinds or shapes of labels, in any instance, the pickers can be made and employed with a section or portion of the picker face rockable, and a portion or section thereof non-rockable; and the form of the pickers or their glue-face portions can be of any shape required to meet the form of the labels for which they are employed.

A bottle-supporting rest I is disposed in a central position at suitable distance below the label-holder, and secured stationary upon the frame by the clamp screw 13, but in a manner to be adjusted up or down thereon for accommodation of different sizes of bottles. A gage or stop 14 is adjustably secured thereon for regulating the position of the bottle in endwise relation to the position at which the label is delivered. The bottle-rest I is preferably arranged rearwardly downwardly inclined in a moderate degree; the neck or fore end of its cradle or seating surface being disposed nearer the plane of the label-holder than is its rear end, so that when the bottle is laid sidewise thereon the top of the bottle-neck is brought more nearly to the level of the pickers, or with the top of the body portion than it otherwise would be; consequently the presentation of dual labels by the horizontal pickers and the working of the gripping members is thereby facilitated and the manipulations rendered more convenient. The fore end of the bottle rest, as herein shown, is provided with guard rollers J for intercepting the neck wipers as hereinafter explained. The position of the bottle is indicated at M.

Above the bottle-rest there is arranged a grip-device K consisting of a finger or lever hinged to the frame A and carrying a contact-piece or member 15, which is preferably furnished with an elastic facing of rubber. Said grip-device is adapted to swing down, as indicated by full lines on Fig. 6, upon the central part of the delivered label for temporarily clamping it against the bottle surface preliminary to its being smoothed down by the wiping-on appliances; and also to swing up beneath the label-holder out of the path of the labels, as indicated by dotted lines on Fig. 6. The grip-device lever is linked to a lever 16 fulcrumed at 17 on the side of the frame and actuated by a cam 18, fixed on the operating shaft, and a suitable spring 19 connected with the lever and frame and strained for giving the required downward pressure for the grip effect. The contact member of the grip-device is attached to the finger K by a loose jointing at 20, and retained in alinement by free playing stud 21, so that said member will assume proper contact at both ends thereof, and give a gripping pressure on two labels at once. For holding neck-labels the gripping member or face may be made with an extension or nose to reach the label on the smaller diametered portion of the bottle.

At either side of the central plane of the bottle-rest there are wipers F, each consisting of a semi-elastic pad, or pads, of rubber, or other suitable material, attached to and projecting inward from the laterally movable rocking wiper-arms E, which latter are made with an offset curve, and of sufficient strength to force the wipers past the bottle. The wiper-arms are carried upon the reciprocating slide D that moves up and down the guide B¹, said slide being in the present instance actuated by a lever 23 in conjunction with a cam 24 fixed on the operating shaft. An adjustable connecting-device d is preferably provided for uniting the lever-pivot bearing and slide D. The wiper-arms E are mounted to rock on forwardly projecting axes or shafts 25 fixed on the wiper-slide D, and there is provided, in combination with said arms, means for positively spreading or swinging them and the wipers apart for their upward movement, and for yieldingly bringing the same together for their downward movement. For this purpose each wiper-arm has, journaled therein at some distance from its axis, a short shaft 26 capable of endwise movement and carrying a guide-roller 27 upon its rear end. A second or bearing roller 28 is mounted adjacent thereto upon a tube fixed in the wiper arm concentric with the shaft 26. (See Figs. 10 and 11.) Upon the frame A there are arranged suitably shaped tracks, surfaces, or guide ways 29 and 30 on which the guide roller 27 travels, and inclined lugs 31 and 32, or means for moving the roller or shaft endwise, are provided near the ends of the tracks, to shift the roller 27 from one track or guide-way 29 to the other track 30, and vice versa. Springs 35 are connected from attaching lugs on the slide D to outwardly projecting hooks 36 on the hubs of the wiper-arms, said springs having tension for pressing or swinging the wiper-arms and wipers yieldably toward each other and keeping the guide-rollers up to the guiding surface of the tracks. The supplemental rollers 28 by running onto suitably formed facets or lugs 37, near the ends of the tracks, serve to take the strain and friction off the rolls and shafts 26 while the endwise shifting thereof is being effected. The fore ends of the wiper-arm axles 25 are best provided with bearing shoes 39 that slide against parallel edge surfaces on the frame, as indicated in Figs. 1, 10 and 11. The parts are suitably confined on the axles by cotter-pins through their ends.

The wipers F, which are preferably made of moderately stiff flexible material of suitable thickness, may be of rectangular or other desirable shape, and are best attached at their outer edge to the wiper-arms by screws and an overlying metal plate, as indicated, their free edges projecting inward in a manner to be flexed against the bottle and label with a wiping effect. Supplementary wipers $F^1$ may be employed when the machine is arranged for placing two or more labels at one operation; or the main wipers can be made of a length sufficient to include all the labeled surfaces.

The label-holder mechanism H is at the upper part of the machine overhanging the pickers and bottle rest, and in direct alinement therewith. It stands stationary at working position while delivering labels; but is removable for interchange of label-holders. The holder-frame is retained in the present instance, by upright studs 40 upon a carrier or support bracket P mounted upon the upper end of the frame, or rear guide $B^1$, and retained in proper alinement by a stud or pin 41. The support is maintained stationary under ordinary conditions, but arranged to permit a limited up and down adjustment or shift movement.

The label-holder is provided with barriers and guide-stakes 42, $42^a$, and 43, having inwardly projecting toe-points $t$ at their lower ends, whereby the pack of labels is supported, kept in proper relation, and presented for delivery from the bottom of the holder to the glue-applying pickers. The barriers and guide-stakes are best combined with means for effecting their adjustment to accommodate labels of different sizes or shapes. As illustrated in Figs. 16 and 17, the label-holder is constructed with compartments for a plurality of packs of labels, as for instance, labels L for the body, and labels $L^1$ for the neck of the bottle. It comprises a back-frame 44 having sockets 45 to fit upon the support-studs 40, and side bars 46 rigidly connecting the back-frame with an upright front-plate 47; also an upright back-plate 48 that is supported on the side-bars. The back-plate and the guide-stakes 42 have hubs adjustably mounted on the side bars 46, and are each provided with a set-screw $s$ for retaining them at position of adjustment. Guide pins 49 are provided for keeping the laterally extending arms of the stakes 42 at proper level. The barrier piece 43 at the front of the compartment $L^1$ is detachably secured to the front-plate by headed studs $n$ that interlock with button-hole slots in the plate, so that such barrier-pieces can be interchanged as desired. A similarly attached barrier-piece $43^a$ is provided at the rear-plate. The guide stakes $42^a$ for the ends of the labels are furnished with spring face portions $42^s$, and are without under projecting lugs $t$. Said end guide-stake members are carried by threaded hubs on the right and left threaded screw 50 across the back of the holder frame, and by means of said screw can be adjusted as required. The faces of the barrier-pieces 43 and $43^a$ are shaped to accord with the particular shape of labels to be used. Hence, labels can be readily interchanged with labels of other shape, as required.

By a construction embodying the features described I provide a label-holder having a plurality of compartments for simutaneously delivering a plurality of independent labels. Said compartments are adjustable independently for form and size of labels, and are adjustable in relation to each other so that the packs of labels may be set nearer together or farther apart.

The label-holder and its support P are designed to stand at a determined position during the operation of the machine; but said support is best arranged with capacity for a limited up and down movement on the frame, or guide B¹, and a lifter,—consisting of a handle-lever 52 pivoted on the frame and having a cam-slot that engages a stud fixed to the side of the member P,—or other suitable means, is combined therewith; whereby the label-holder mechanism can be temporarily raised and held elevated, with the packs of labels out of reach of the pickers; thus affording facility for stopping the feed of labels at any time when desired. This feature is of great convenience when starting up the machine, since it permits of the running of the mechanism to get the pickers thoroughly coated with glue before the delivery of labels thereto. The lifter handle can also be instantly operated for throwing the label-feed into and out of action.

Follower devices are provided for holding the pack, or packs, of labels compressed and preventing their excessive lifting of the pack by the picker contact. Said devices consist of an arm 53 the rear end of which is mounted to slide on an upright bar 54 fixed in the label-holder support P, and to have free downward action thereon, but to resist upward movement when pressure is applied at its fore-end. (See Fig. 16.) At its fore-end said arm is provided with a chambered, downwardly extending portion 55 containing a movable contact-point or stud 56 and a spring 57 acting against the stud to yieldably press it outward. The arm is also provided in its upper part with a small pivoted lever 58 that acts frictionally against the front face of the upright standard, to prevent the arm from dropping too freely thereon, and a spring 59 within the arm is connected with the lever for exerting yielding pressure thereon. A follower-plate 60 is placed upon the pack of labels, and an evener device 61 is arranged beneath the contact-point or arm, for distributing the pressure to the several packs. When only a single pack is employed the evener-device may be omitted.

The glue-box or reservoir G is made as shown in Figs. 4, 6 and 7, and is supported on a transverse rod and seat, at the upper part of the frame below the label-holder, where it is retained by a catch-device 63 in a manner to be quickly taken off or replaced, as required. Said glue-box is provided as usual with a delivery roller O running therein. The roller axle is mounted in bearings that permit the ready removal of the roller from the box, and the axle is provided with a gear 64, and a sprocket-wheel 65 which engages with a drive-chain 66 running from a sprocket-wheel 67 on the operating shaft whereby rotation of the delivery roller is effected. The upper loop of the drive-chain 66 is carried by guide-sheave 66ª and the glue-roll sprocket 65 is engaged with the back run of said chain, so that the glue-box and delivery roll can be readily removed for cleaning, and replaced without taking down the chain.

An adjustable scraper 68 is provided for gaging the quantity of glue or adhesive brought up by the delivery roller. Said scraper is constructed with a lipped face standing adjacent to the roller face, and with arms that extend outside, and are supported by inclined studs, springs, and adjusting-nuts at the ends of the glue-box, as indicated at 69, so that the scraper can be nicely adjusted to the face of the roll, more or less at either end, by turning the nuts.

The transfer-roll R is mounted on a rotatable axle r, and serves for carrying glue or adhesive from the delivery roller O and spreading a film of the same upon the faces of the pickers. This roll is supported by a pair of rocking arms Q, united at their lower ends and pivotally supported at 71 to rock backward and forward, with a rising trend that approximately corresponds with the upward movement of the pickers, in their backward movement which brings the transfer-roll into contact with the face of the glue-delivery roller. (See dotted line Fig. 4.) The pickers are brought into contact with the transfer roll as they move upward toward the label-holder, so that by the differential movement of the parts the roll R is caused to roll along the faces of the pickers, after which the transfer roll lies in contact with the delivery roller while the pickers take the label and descend to their first position.

The axle r is provided with a gear 72 that meshes with the gear 64 on the delivery-roll axle, thereby causing positive and uniform movement of the adjacent roll surfaces while in contact.

The arms Q are formed with bearing shoulders, and provided with springs 73 adapted for retaining the roll-axle in conjunction therewith; so that the axle with the roll can be instantly removed and replaced for cleaning or other purposes. The axle is provided with loose bushing sleeves 74 (see Fig. 8) to insure free action and prevent the retaining springs 73 from causing friction on the journals. The springs 73 also permit a degree of elasticity in the action of the transfer-roll when said roll comes into contact with the pickers, or with the delivery-roll, and thus avoids stiffness or rigidity in the operation of the mechanism.

The rocking arms are operated by a suitable connection 75, jointed to the ear 70, and actuated by a cam 76 on the shaft 2; said connection being preferably provided with means for adjustment, as best shown in Fig. 4.

The cams 24 and 76, which respectively actuate the wiper-slide D and the transfer roller arms Q, are preferably grooved cams, or made with outside and inside bearing surfaces that engage the roller-studs on their levers, so that the parts are positively moved in both directions of their reciprocation.

For affixing neck labels, or labels that extend entirely or nearly around the circumference of the bottle, there is provided a presser means adapted to move up to the bottle, and to press the ends of the label against the surface thereof, after the wipers have passed and laid the main portion of the label smoothly thereon. This under presser, as shown in Figs. 1, 4 and 12, consists of a vertically movable rod or member 80 having an elastic presser-pad 81 thereon which is moved upward after the wipers have left the label in the form substantially as indicated at $l$ in Fig. 12. Across the face of the pad there is a groove within which there is arranged a yieldably supported metal strip 82 having a smooth hollow-curved top edge that is normally held above the pad face by the action of a spring 83 beneath its guiding stem. (See Fig. 12.) When the pad is moved upward the curved edge of the metal strip first striking the edges of the label causes the same to slide inward and the approaching pad then presses them firmly against the surface of the bottle; the yielding of the spring 83 allowing the metal strip to close into the groove flush with the pad face. For labels, the ends of which would lap by each other, the pad 81 and strip 82 may be made in two sections, with one side of their faces slightly in advance of the other, so as to favor one edge of the label in its closure against the bottle surface. For actuation of this under pressing device, its guiding rod is connected by a link 84 with a suitably fulcrumed lever 85, which is controlled and actuated by a cam 86 on the operating shaft, and a spring 87 suitably attached and having tension for moving the lever and connected parts when the curvature of the cam recedes. This under pressure mechanism is not required in cases where the labels are only of such length as can be fully smoothed down by the wipers; and may, in some instances, be omitted. It is however a useful adjunct in the affixing of neck labels.

The operating shaft 2 is furnished with a drive-wheel or pulley 3 that is mounted loose upon said shaft and connected therewith for operation by an automatic-stop clutch 4 controlled by a treadle 90 hinged to the base of the frame, and having a connecting rod 91 therefrom to the throw-off lever 92 of the clutch, so that depression of said treadle will put the clutch into action, and when the treadle is released the clutch will be thrown out of operating engagement, at the proper position, automatically. A spring 93 is provided for returning the clutch-controlling parts to normal position. The pulley and shaft revolve in the direction indicated by the arrows on Figs. 3 and 4.

The several cams and operating connections are shaped and arranged to give the required movements and time of movement to the various parts, so that the full operation of delivering, pasting and affixing a label to the bottle is performed during one revolution of the operating shaft.

In the operation the attendant places a bottle upon the supporting rest and depresses the clutch-releasing treadle. The machine being thus put into motion under the power of the driving pulley or prime mover, the picker-carrier C moves upward carrying the pickers 5 first against the transfer roll R which spread a film of glue or adhesive material thereon, and then against the bottom of the packs of labels L and L¹ upon the label holder. The under label is caused to adhere to the glue coated face of the pickers and is delivered or drawn from the label-holder as the pickers descend, the latter carrying the label or labels and presenting the same above the position of the bottle M. The grip-finger K is then brought down by the movement of the lever 16, causing its face member 15 to press a central portion of the label, or labels, firmly against the bottle with a grip that holds the label fast while the pickers 5 are again elevated to take another charge of glue for the next action. This upward movement strips the labels from the pickers, leaving the ends of the label free with a coating of glue thereon, and in position for being wiped onto the bottle. The wiper devices next close inward over the label and then descend, thereby wiping the label firmly upon the bottle surface by the yielding pressure of the flexible wipers F F¹ as they pass the respective sides of the bottle and its supporter. When the wiper-slide D moves downward the roller 27 runs on the track 29, as indicated in Fig. 10, and by dotted lines in Fig. 9, allowing the wipers to close together and to act against the bottle under the influence of the springs 35. As the wiper-arms approach the end of their downward movement they are caused by the curvature of the track to move apart laterally, for opening the space between the wipers. The roller 28 runs onto the lug 37 and takes the bearing strain while the end of the shaft 26 is carried against the inclined lug 31 and the shaft 26 and roller 27 shifted from alinement with track 29 into alinement with track 30. Then as said wiper-slide moves upward the roller 27 runs on the track 30, as indicated in full lines Fig. 9 and in Fig. 11, causing the spread of the wipers apart, and maintaining such open relation while they are elevated to near their uppermost position where the roller 27 meets the inclined lug 32 which shifts the shaft 26 endwise and again brings the roller 27 into alinement with the downward track. After the wipers have performed their work the under presser 81 moves up and fixes the ends of the label $l$ as hereinbefore explained. The rollers J prevent the neck-label wipers $F^1$ from interfering with the under-presser devices as the wipers descend. When the grip-finger has performed its function of holding the label until secured by the wipers, said finger is swung upward out of the way, so as not to interfere with the succeeding label while it is being taken from the label-holder. Preceding the upward movement of the pickers, the transfer-roll R is moved, by the oscillation of its supporting arms Q, from the glue-delivering roll G into the path of the upwardly moving pickers, and is then caused to roll across the picker faces as it swings back into contact with the face of the glue-delivering roll. When the shaft completes its revolution (if the treadle is free) the clutch 4 automatically releases the pulley and the mechanism stops at the proper position, and the labeled bottle may be removed and replaced by another; or if the treadle is held depressed the machine will continue running and the bottles can be exchanged at the proper moment without stopping the mechanism for the exchange. It will be seen that the wiper-arms E spread apart after passing the bottle, by the curvature of the tracks 30 near their lower ends; then, as the wipers ascend they are positively maintained spread, by the tracks 29, which are preferably formed to increase the spread during the upward movement of the wipers, so that they will not interfere with the placement and removal of the bottles on the rest; while the interval during which the wipers are spread is such that it allows the attendant ample time for taking the bottle out and replacing it with another when the machine is in motion, or without working the clutch between each operation. This is a feature of considerable importance in the practical running of the machine.

The machine may, in some instances, be made without the bearing rolls 28, as it is fully operative with such rolls omitted; but their use saves much wear and friction on the guide-rolls 27, and on the end of the tracks where said guide-rolls slide when shifted.

What I claim and desire to secure by Letters Patent is—

1. In a labeling machine, in combination substantially as described, the bottle-supporting rest, a stationary overhanging label-holder, pickers that move in a direct alinement therewith to and from the bottom of said label-holder, for taking and presenting the label at a position above the rest, means for carrying and operating said pickers, means for applying glue to the picker faces, a label-gripping device, a pair of wipers mounted on wiper-arms independently supported on a vertically moving carrier-slide, means for effecting and controlling opposite lateral movements of said wipers, and means for reciprocating the wiper-carrier-slide.

2. A bottle-labeling machine comprising a bottle-rest, directly reciprocating pickers, reciprocating laterally rocking wipers, and a non-moving bottom-delivery label-holder, said parts severally disposed for action in alinement with the direction of movement of the pickers, a glue-box and glue delivery roll, and a transfer-roll that moves from said delivery roll transversely across the vertical path of the pickers.

3. In a labeling machine, the combination, substantially as described, of the frame provided with the upright front guide-rod, a reciprocating bifurcated picker-carrier movable on said front guide, pickers detachably secured to the arms of said carrier with their faces approximately perpendicular to the line of the carrier movement, a stationary overhead label-holder, a stationary bottle-rest, an operating shaft, and means actuated from said shaft for moving the picker-carrier up and down the guide rod, to bring the pickers into conjunction with the label-holder.

4. In a labeling machine, the combination, of the stationary bottle-rest, vertically reciprocating picker-carrier having arms, pickers fixed on said arms, independently operating oscillating wiper-arms, wipers carried thereon, means for controlling said wiper arms, means for spreading glue upon the pickers, and a stationary overhead label-holder in line with the picker movement.

5. In a labeling machine, in combination, means for supporting and delivering labels, a stationary bottle rest, an oscillating finger having means for gripping a label against the bottle surface, a reciprocating picker-carrier movable to and from the label delivery, picker devices secured upon said carrier and each comprising an axis member having an attaching head and provided with recoilable rocking or tiltable glue-applying fact that receive the labels, and means for supplying glue to said faces.

6. In a labeling machine, in combination, a bottom-delivering label-holder comprising means for supporting labels at their edges and adapted for the downward extraction of single labels therefrom, a stationary bottle rest, an intermediately acting means for gripping a label against the top surface of a bottle laid upon said rest, a reciprocating picker-carrier, picker devices mounted upon said carrier and movable directly to and from the bottom delivery of the label-holder, said pickers provided with glue-applying faces that receive the label, means for retracting the gripping devices out of the path of the label-feed, and means for supplying glue to the picker-faces while they approach the label-holder.

7. In a labeling machine, a glue-applying picker provided with a tiltable or rocking face member that contacts with the label, and a pivoting axis for said face member disposed approximately adjacent to the face portion and transverse to the direction of its line of draft, and means for limiting the rocking movement of said face members.

8. In a labeling machine, the combination, of a bottom delivery label-holder having facilities for supporting a plurality of packs of labels, a reciprocating picker-carrier, and pickers having means for attachment to said carrier and provided with tilting or rockable face members that contact with the labels.

9. In a labeling machine, a reciprocating picker-carrier, glue-applying pickers supported on said carrier, said pickers each provided with an axis member and a rockable face portion or member, means for limiting the extent of rocking movement of the face member, and a spring for returning said rockable face member to its normal position.

10. In a labeling machine, in combination, a stationary underlying bottle-rest, vertically reciprocating pickers, a wiper mechanism, an overhead top-chargeable bottom-delivering label-holder, a movable grip-finger disposed above the bottle-rest and beneath the label-holder, and having its end pivoted to the frame in rear of the bottle-receiving space, to swing down upon the bottle and upward and backward beneath the label-holder, and means for operating said grip-finger.

11. In a bottle-labeling machine, in combination, an upright supporting-frame having a forward projecting top member, an underlying bottle-rest supported upon a lower front portion of said frame, a top-chargeable, bottom-delivering label-holder removably supported upon said top member of the frame and projecting forward over said bottle-rest, a vertically reciprocating picker-carrier having horizontally-projecting glue-applying pickers secured thereon, guiding means that directs said picker-carrier to carry the pickers perpendicular to the plane of the labels, to and from the label-holder, a label-gripping means disposed between the label-holder and bottle-rest and hingingly connected with the frame adjacent to the rear of the bottle-receiving space to swing down upon the presented label and up to an approximately upright position beneath the label-holder, actuating connections for operating said gripping means and said picker-carrier, and a wiper-carrier having opposite arms carrying means for wiping down the ends of the labels at either side of the bottle.

12. In a labeling machine, the combination, of a duplex label-holder having means for delivering labels at two positions, a grip-device adapted for gripping two independent labels simultaneously, means for gluing and presenting the labels in position for the grip-device and at the place of attachment, a bottle supporter, means for wiping down the edges of the two gripped labels, and means for actuating said grip-device.

13. In a labeling machine, in combination, means for guiding and supporting a plurality of label packs and for delivering labels therefrom, a grip-device adapted for gripping the several delivered labels, means for gluing and presenting the labels in position for the grip, a bottle supporter, means for wiping down the edges of the gripped labels, and means for actuating said grip device.

14. In a labeling machine, the combination, with a bottle-rest, a label-holder adapted for delivering body labels and neck labels, and means for gluing a plurality of labels and presenting the same for affixment to a bottle placed upon said rest; of a grip-device adapted for holding a body label and provided with an extension adapted for simultaneously holding a neck-label, and means for moving said grip-device to and from its gripping position.

15. In a labeling machine, a grip-device provided with a tiltable loosely attached face-member adapted for acting against and distributing the pressure upon separate labels simultaneously; in combination, with a bottle-rest, means for gluing and presenting a plurality of labels adjacent to a bottle placed upon said rest, and means for swinging the grip-device to and from its gripping position.

16. In a labeling machine, the combination, with a reciprocating picker-carrier, pickers mounted on said carrier, means for supplying adhesive to said pickers, a bottle rest, and a bottom-delivery label-holder, of a grip-device hingedly supported on the frame beneath said label-holder; means for yieldingly swinging the grip-device toward the bottle-rest, means for positively swinging said grip-device toward the label-holder and out of the path of the label feed; and means for reciprocating the picker-carrier.

17. In a labeling machine, in combination, with the bottle-rest, an overhead bottom-delivery label-holder, pickers reciprocating to and from said label-holder, and means of supplying adhesive substance to said pickers; of a grip-finger pivotally supported at its rear end to swing upwardly backward beneath the label-holder, a finger-actuating lever connected therewith, a spring connected to said lever for depressing said grip-finger, an operating shaft, and a cam on said shaft adapted for moving said lever to elevate said grip-finger.

18. In a labeling machine, the combination of a reciprocating wiper-slide consisting of a central guiding body, and provided at right and left of the guiding body with forwardly projecting axis-studs, a guide-rod supporting said wiper-slide in central relation, a pair of forwardly projecting rockable wiper-arms having their respective bearing hubs mounted upon said axis-studs carried by said wiper-slide, wipers supported on said arms, means for controlling the rocking action of said wiper-arms independent of the article being labeled, and means for reciprocating the wiper-slide.

19. In a labeling machine, the combination, of a reciprocating wiper-slide, a pair of forwardly extending laterally rockable wiper-arms having offset rear ends with bearing hubs pivotally mounted on axes carried on said slide, wipers supported on said wiper-arms, means in connection with the bearing hubs for positively spreading the wiper-arms apart as they approach the limit of downward movement, means for maintaining them opened during their upward movement, and means for reciprocating said wiper-slide.

20. In a labeling machine, the combination, of a reciprocating wiper-slide, laterally movable wiper-arms carried upon said slide, wipers supported on said wiper-arms, means for positively spreading the wiper-arms apart as they approach the limit of their downward movement, means for increasing the amount of spread of said wiper-arms as they move upward, and means for reciprocating the wiper-slide.

21. In a labeling machine, a reciprocating wiper-slide, a guide-rod therefor fixed on the frame, lateral rocking wiper-arms pivoted to said slide, wipers carried on said arms, bearing rolls mounted on endwise movable axles supported in the wiper-arms, differential guide-tracks for said rolls, and means for shifting said rolls into alinement with the respective guide-tracks for the upward and downward movements of the wiper mechanism, and means for yieldingly closing the wiper-arms toward each other in opposition to said guide-tracks.

22. In a labeling machine, the combination, of a reciprocating wiper-slide, a pair of laterally rockable wiper-arms carried upon said wiper-slide, wipers supported on said wiper-arms, stationary upward and downward guide-surfaces for positively effecting the spread of said wiper-arms apart and controlling the extent of their spread, shiftable guide-rolls mounted on the wiper-arms for contact with said guide-surfaces, non-shiftable bearing-rolls adjacent to said guide-rolls, means for yieldingly pressing the wiper-arms toward each other, inclined lugs for shifting the guide-rolls from one guide-surface to the other, facets that co-act with the bearing-rolls for relieving pressure on the guide-rolls during their shifting action, and means for reciprocating said wiper-slide.

23. In combination with a bottle-rest, an overhead label-holder mechanism, and reciprocating pickers in line with said label-holder; a reciprocating wiper-slide, an upright guide therefor, rocking wiper-arms carried on said wiper-slide and projecting forward beneath the label-holder, wipers fixed on said arms, guide-rolls and shaped track surfaces that govern the lateral or rocking movement of the wiper-arms, springs connected with said wiper-slide and wiper-arms for yieldingly pressing the wiper-arms and guide-rolls toward the track surfaces, and means for reciprocating the wiper-slide.

24. In a labeling machine, the combination, with a stationary bottle-rest, and means for simultaneously gluing and presenting a plurality of labels above a bottle resting thereon; of a pair of laterally rocking wiper-arms, a reciprocating slide on which said wiper-arms are pivotally supported, a main wiper and a supplemental wiper fixed to each of said arms, means for reciprocating said wiper-slide to carry the wipers past the bottle-rest, a means for yieldingly pressing the wiper-arms toward each other for their downward movement, and means for spreading the arms apart for their upward movement.

25. In a labeling machine, in combination, an over-head non-moving bottom-delivery label-holder, a vertically reciprocating picker-carrier comprising a pair of rigidly united arms having picker supporting seats at their ends, horizontally projecting glue-applying picker-plates detachably fixed to said carrier arms and presenting top faces that take labels from the bottom of said label-holder, means for sustaining a bottle below the label-holder, a picker-carrier guide, and actuating means causing said pickers to have reciprocal action between the label-holder and position of the bottle in a direction perpendicular to the plane of the labels, and means of applying glue to the picker faces during their upward movement.

26. A duplex bottom-delivery label-holder having means for supporting a pack of body labels and a pack of neck labels, and adapted for simultaneous delivery of a label from each pack, in combination with glue-applying pickers that move to and from the bottom of said label-holder and the position of affixment of the label, in a straight alinement perpendicular to the planes thereof, and means for regulating the relative adjacence of the two packs of labels in relation to each other.

27. In a labeling machine for affixing labels to bottles, a means for supporting a plurality of packs of labels; in combination, with a rearwardly and downwardly inclined rest for the bottle, and means for clamping a plurality of labels on the bottle, opposite to said rest.

28. In a labeling machine, a duplex bottom-delivery label-holder provided with means for separately adjusting the size of the respective label-holding compartments, in combination with means for taking a label separately from each compartment, means for temporarily clamping said separate labels against the surface to be labeled, and means for affixing the labels to a bottle, or the like.

29. In a labeling machine, a duplex bottom-delivery label-supply holder comprising means for supporting a plurality of packs of labels of unlike shape and size, and consisting of an open-centered frame having a body or back member provided with engaging means for removably connecting it with the main support, side-bar guide members connecting the front and back members of said holder-frame, label-guiding members that permit the taking of a label from the bottom of each pack, supports for said label-guiding members mounted upon said side-bars and adjustable for independent regulation of the size of the pack-compartments and the relative position of the pack-compartments in respect to each other, and means for retaining said supports at adjusted position; in combination with pasting pickers acting beneath the label-holder against the bottom of the label-packs, and wiper-carrying mechanism having a plurality of wipers adapted for wiping on the labels.

30. In a labeling machine, a duplex bottom-delivery label-holder provided with a compartment having its front and rear label-guiding members carried by supports that are slidable on guides or side-bars parallel with the plane of the labels toward and from its other compartment, for adjusting the position of the label-holding compartments in relation to each other, and means for securing the same at adjusted positions.

31. In a labeling machine, a label-holder having a plurality of label-holding compartments, means for increasing or diminishing the individual size of the respective compartments independently of each other, and means for regulating the adjacence of the separate compartments nearer to or farther from each other; in combination, with means for simultaneously taking a label from each compartment.

32. In a labeling machine, a label-holder having a plurality of label-supporting compartments disposed in front and rear relation, and with coincident central alinement; in combination, with means for slidingly adjusting the transverse compartment walls or barriers for changing the individual size, and rearward and forward relation of the label packs without varying such central alinement, and a pair of glue-receiving pickers that act at the respective ends of the labels, said pickers individually extending across all the compartments at either side of said central line.

33. In a labeling machine, a bottom-delivery label-holder comprising a front compartment and a rear compartment, each adapted for holding a separate pack of labels, in combination with pickers each provided with a plurality of glue-receiving face-portions for picking labels from the respective compartments simultaneously.

34. In a labeling machine, the combination of means for supporting a plurality of packs of labels and adapted for the simultaneous delivery of labels from each pack, a non-movable bottle-supporter, gluing pickers that receive and transfer labels from the several packs to positions for their affixment to a bottle resting on said supporter, means for clamping the several labels at their positions upon the bottle, and means for completing the affixment of the several labels upon the bottle.

35. In a labeling machine, in combination, means for supporting a plurality of label packs, a bottle-rest, means for gripping the labels against the bottle surface, a picker-carrier movable to and from the label delivery, picker devices secured upon said carrier and provided with rocking or tiltable glue-applying faces that receive the labels, and means for supplying glue to said faces.

36. In a labeling machine, the combination, with the label-holder provided with upright front or back support-pieces having button-hole slots or openings therein; of a removable label-pack barrier having headed studs thereon that interlock with said openings for detachably retaining said barrier in position.

37. In a labeling machine, a label-holder provided with a supporting member, parallel side-bars secured therein, label-holding stakes having support arms and hubs adjustably mounted on the side-bars, means for securing the hubs at position of adjustment, and guides parallel with the side-bars, for preventing rotative displacement of said hubs and stake-supporting arms.

38. In a labeling machine, a label-holder having its barriers or guide-stakes for the front and rear edges of the label-pack furnished with under-projecting supporting points, and its guide-stakes at the ends of the label-pack formed without under-projecting points and provided with flat face-springs yieldably extending at their lower ends, in combination with glue-applying pickers that contact with the end portions of the label adjacent to said spring faces, for the purpose set forth.

39. In a labeling machine, in combination, with the picker mechanism, and a label-holder adapted for supporting a plurality of packs of labels; a follower consisting of an arm having one end in frictional connection with a stationary standing bar and provided at its other end with a yieldable bearer or contact-member, a follower plate for each pack, and an evener device between said plates and the contact-member, whereby the follower pressure is distributed to each of the packs.

40. In a labeling machine, the combination, with the bottom-delivery label-holder, and an upright follower-supporting bar; of a follower arm slidably mounted on the bar to resist upward pressure at its fore end, a friction finger pivoted in said arm to act against the face of the bar, a spring connected with said finger, a yieldable bearer or contact-member for pressing upon the pack, a spring within the arm acting against the contact-member, and means for adjusting the tension of said last named spring.

41. In a labeling machine, in combination, with the main frame and upwardly acting picker mechanism; a label-holder-support mounted on the frame, an overhanging bottom-delivery label-holder detachably connected with said label-holder-support, an upright follower-guide bar fixed on said support independent of the label-holder, and a follower-arm slidably mounted on said bar by an upwardly-cramping joint, said arm provided with a fore-end member containing a contact point, a spring yieldably pressing on said point, and a spring-adjusting screw, substantially as set forth.

42. In a labeling machine, a reciprocating picker-carrier with glue-applying pickers thereon, a label-holder for supplying labels to said pickers and means for shifting the label-holder out of reach of said pickers.

43. In a labeling machine, the combination, of a bottom-delivery label-holder, a reciprocating picker-carrier with glue-applying pickers thereon that move into conjunction with said label-holder for receiving the label, and means for temporarily shifting the label-holder beyond the reach of said pickers, for the purpose set forth.

44. In a labeling machine, the combination, of a label-holder supported for delivering the labels at a predetermined stationary position, a reciprocating picker mechanism with glue-applying pickers movable to and from said delivering position in a direction approximately perpendicular to the plane of the label-holder, and means for temporarily retracting the label-holder beyond its predetermined delivering position, to carry the labels out of reach of the pickers.

45. In a labeling machine, in combination with the supporting frame, vertically reciprocating picker-carrier and glue-applying pickers; a bottom-delivery label-holder mounted to have limited vertical movement in relation to the supporting frame, and a manually controlled means for temporarily elevating said label-holder from its position of contact with said pickers for throwing the label-feed out of operation.

46. The combination, with reciprocating label-receiving picker mechanism, the label-holder, and a support for said label-holder mounted upon a guide in connection with the frame; of a handle-lever provided with means for shifting said label-holder-support on its guide to move the label-supply a limited distance out of reach of the picker-mechanism, and for temporarily retaining it at the shift position.

47. In a labeling machine, the combination, with the supporting frame, and vertically reciprocating picker mechanism; of a bottom-delivery label-holder, a support therefor adapted to have vertical movement upon the frame, a hand-lever pivoted on the frame and engaging by a cam-slot and stud with the label-holder support, and adapted for effecting limited elevation and depression of the label-holder mechanism by swing of said hand-lever.

48. In a labeling machine, the combination, with means for gluing, delivering and wiping-on a label upon a bottle; of an under presser-device for securing the dependent ends of the label left free by the wipers, and means for moving said under presser-device to and from the bottle surface.

49. In a labeling machine, in combination, with a bottle-rest and means for delivering gluing and wiping-on a body label and a neck label; of a presser mechanism acting beneath the bottle neck, for laying the ends of the neck label which are beyond the reach of the wipers, around the bottle-neck, and means for advancing and retracting said presser.

50. In a labeling machine, in combination, with a bottle-rest, a label-holder, picker-mechanism, and wiper mechanism; an under presser-mechanism comprising a reciprocating rod, an elastic presser pad carried thereon, a concavely curved guard-piece projecting from the face of the pad and having a guide stem, a spring yieldably supporting said stem and guard-piece, a rocking lever connected to said rod, an operating shaft, a lever-actuating cam on the operating shaft, and a spring connected for actuation of the parts in opposition to the cam movement.

51. In a labeling machine, in combination, with the glue-delivery-roll, and vertically moving pickers: the glue-transfer-roll mounted on rocking carrier-arms adapted to swing across the path of the pickers with a backwardly upward trend that approximately corresponds with the upward movement of said pickers as said roll passes across the picker faces.

52. In a labeling machine, the rocking carrier-arms having bearing shoulders, and provided with retaining springs opposite said shoulders, and the transfer-roll having its axle supported on said arms, and retained by said springs, in combination, with the glue-box, delivery-roll, vertically moving pickers, rocker actuating connections, and controlling cam on the operating shaft.

53. In a labeling machine, the combination, with the picker, and glue-delivering roll, the rocking carrier-arms having a bearing shoulder and provided with an axle-retaining spring, the transfer-roll having its axle provided with loose bushing sleeves removably supported on said arms and retained by the bearing shoulders and said springs.

54. In a labeling machine, the combination, of the glue-box, the delivery roll mounted therein, its axle provided with a gear-wheel and a sprocket-wheel, the transfer roll, its axle supported by rocking arms, and having a gear that comes into mesh with the gear on the delivery-roll-axle, a sprocket on the operating shaft, and a drive-chain running therefrom, a guide-sheave for the upper loop of said chain, whereby it is directed for engaging the sprocket on the delivery-roll-axle, substantially as set forth.

55. In a labeling machine, the combination, of an overhead label-holder, a glue-box having a glue-delivering roll adjacently below said label-holder, a vertically moving picker-carrier having upwardly extended arms, glue-applying pickers attached to said arms, a transfer roll movable from the delivery roll across the path of the pickers below the label-holder, said transfer roll carried by upwardly projecting rocking arms pivoted on the frame below the level of the pickers, means for actuating said arms, and means for moving the picker-carrier, substantially as set forth.

56. A labeling machine comprising, in combination, a standing frame having an upright front guide and rear guide, a non-moving overhanging bottom-delivery label-holder, a bottle-rest below the label-holder, a picker-carrier movable on the front-guide and having upwardly extending arms, pickers attached to said arms, a wiper-slide movable on the rear-guide, forwardly projecting offset wiper-arms rockably supported on the wiper-slide, wipers fixed on said arms, means for controlling the rocking action of the wiper-arms, a grip-device pivotally mounted on the frame to swing down over the bottle-rest and up beneath the label holder, means for actuating said grip-device, a glue-box and delivery-roll, a transfer-roll, a rocking armed carrier therefor adapted to carry said transfer-roll across the path of the pickers, an operating shaft journaled in a transverse bearing on the frame, a series of cams on said shaft, and means for transmitting motion from the several cams to the respective carriers and slides, substantially as set forth.

57. In a labeling machine, a wiper-mechanism comprising a reciprocating slide, a pair of laterally separable wipers, movable arms in connection with the slide for supporting said wipers, guiding-rolls mounted on said arms, guide-surfaces against which said rolls travel, said guide surfaces formed for directing the lateral movement of the wiper-arms, means for maintaining the contact of the guiding-rolls with said guide-surfaces, and means for moving the reciprocating slide.

58. In a labeling machine, an overlying bottom-delivery label-holder having means for horizontally supporting a plurality of packs of labels, in combination with a stationary bottle-rest and for the sidewise support of a bottle, disposed beneath said label-holder with one of its ends nearer the plane of the label-holder than the other, and means for clamping a plurality of labels upon a bottle above said rest.

59. In a labeling machine, the combination of an overlying label-holder having means for supporting a plurality of packs of labels, means for delivering a separate label from the bottom of each of the several packs, a rearwardly and downwardly inclined bottle rest beneath said label-holder, means for simultaneously clamping a plurality of labels to a bottle laid upon said rest, and means for affixing the separate labels to the bottle.

60. In a labeling machine, a horizontally disposed holder having means for supporting a plurality of packs of labels, an inclined stationary bottle rest having its neck end nearer the bottom plane of the label packs, glue-applying pickers acting in conjunction therewith for taking single labels from the bottom of each pack and horizontally presenting the same above a bottle laid on said rest, a label-clamping finger with means for clamping a plurality of labels at their positions upon the bottles, and label-wipers for wiping on the respective ends of said labels.

61. In a labeling machine, the combination of a bottom-delivery label-holder, a stationary bottle-supporting rest, and pasting-pickers that take the labels from said holder and present the labels above said rest, means for centrically gripping a label, and wipers for wiping a label onto a bottle, said wipers being closed together for wiping the label, when passing the bottle in one direction, and spread apart when passing in opposite direction.

62. In a labeling machine, in combination with means for pasting and presenting a plurality of labels to a bottle, of reciprocating wipers having a plurality of wiping members adapted to act closed together when passing the bottle in one direction, and means whereby said wipers are separated when passing in the opposite direction.

63. In a labeling machine for affixing labels to bottles, a means for supporting a plurality of packs of labels; in combination with a follower, and means for distributing the pressure of said follower to act independently upon the several packs of a plurality of packs of labels.

64. In a labeling machine for affixing labels to bottles, means for supporting a plurality of packs of labels for delivery of separate labels, a plurality of follower-plates for said packs, in combination with a follower and means for distributing the pressure of said follower to the several follower-plates.

65. In a labeling machine, in combination with means for affixing labels to bottles; means for supporting a plurality of packs of labels and separately delivering labels from the respective packs, a gravity actuated automatically-acting follower, and a self-regulating means for distributing the pressure of the follower to each pack of a plurality of packs of labels.

66. In a labeling machine for affixing labels to bottles, in combination with means for supporting a plurality of packs of labels; a yieldable compressing follower, a plurality of follower-plates, and an evener-device for distributing the pressure of the follower to the several follower-plates.

67. In a labeling machine, the combination, of a bottom-delivering label-holder adapted for supplying labels from under the surface of a pack of labels supported thereon, reciprocating pasting-pickers that contact with the bottom of the pack of labels at a predetermined position for taking a label from said label-holder, and a manually operated feed-controlling means adapted to impart a limited lifting movement to the label-holder for elevating and holding the same out of feeding contact with the pickers, and vice versa, while the machine is operating.

68. In a labeling machine the combination, of an open-bottom label-box, a pair of pickers for taking the bottom label from the pack in the label-box through the open bottom of said label-box, and presenting it to the bottle below the label-box, a clamp for holding each label in place while being applied to the bottle, and a pair of wipers for smoothing the label onto the bottle.

69. In a labeling machine, the combination of a top-charged open-bottomed label-box comprising a pair of side plates, a pair of end plates, means for adjusting the label-box to receive different sized labels while the center of the label-box remains at a fixed position, glue-applying pickers for adhesively removing one label at a time from the bottom of a pile of labels in the label-box by taking said bottom label, perpendicular to the plane thereof, through the open bottom of said label-box, and wipers for applying said label to a bottle or the like, below said label-box.

70. In a labeling machine, in combination with a bottom-delivering label-holder adapted for supporting a plurality of packs of labels, and the means for taking labels from the bottom of each pack; a lift-resisting follower common to the several packs, and comprising a single resistance-device and an evener-member rockably combined with said resistance-device, and having its respective ends disposed to bear upon the respective packs of labels for distributing the resisting-force to the several packs.

71. In a labeling machine, in combination, an overhead bottom-delivery label-holder, a vertically moving picker-carrier, horizontally projecting glue-applying pickers secured upon said carrier, said picker-carrier having reciprocating action that moves the pickers in straight alinement between the label-holder and position of the bottle, in a direction perpendicular to the plane of the labels, a stationary rearwardly inclined bottle-rest, and a grip-device hinged to the frame in rear of the path of said pickers and adapted to swing down between the pickers when depressed and to swing upward and rearward from the path of the pickers when elevated.

72. In a labeling machine having an overhead bottom-delivery label-holder, an underlying bottle-rest, a vertically movable picker-carrier, and a glue-supply reservoir with a glue-delivering roller; a glue-applying picker provided with an axis member mounted upon said picker-carrier to permit a partial rotation of the picker, and a glue-transferring roller that alternately contacts with said glue-delivering roller and the picker face, means for operating the picker-carrier and means for actuating said glue-transferring roller.

Witness my hand this eighth day of March, 1904.

FRANK O. WOODLAND.

Witnesses:
CHAS. H. BURLEIGH,
ELLA P. BLEMIS.

Correction in Letters Patent No. 941,178.

It is hereby certified that in Letters Patent No. 941,178, granted November 23, 1909, upon the application of Frank O. Woodland, of Worcester, Massachusetts, for an improvement in "Labeling-Machines," an error appears in the printed specification requiring correction as follows: Page 11, line 90, the word "and" should be stricken out; and that the said Letters Patent should be read with this correction therein that the same may, conform to the record of the case in the Patent Office.

Signed and sealed this 24th day of May, A. D., 1910.

[SEAL.]

C. C. BILLINGS,
*Acting Commissioner of Patents.*